J. B. ADT.
FILTERING PRESS.
APPLICATION FILED SEPT. 5, 1913.
1,098,075.
Patented May 26, 1914.
3 SHEETS—SHEET 1.
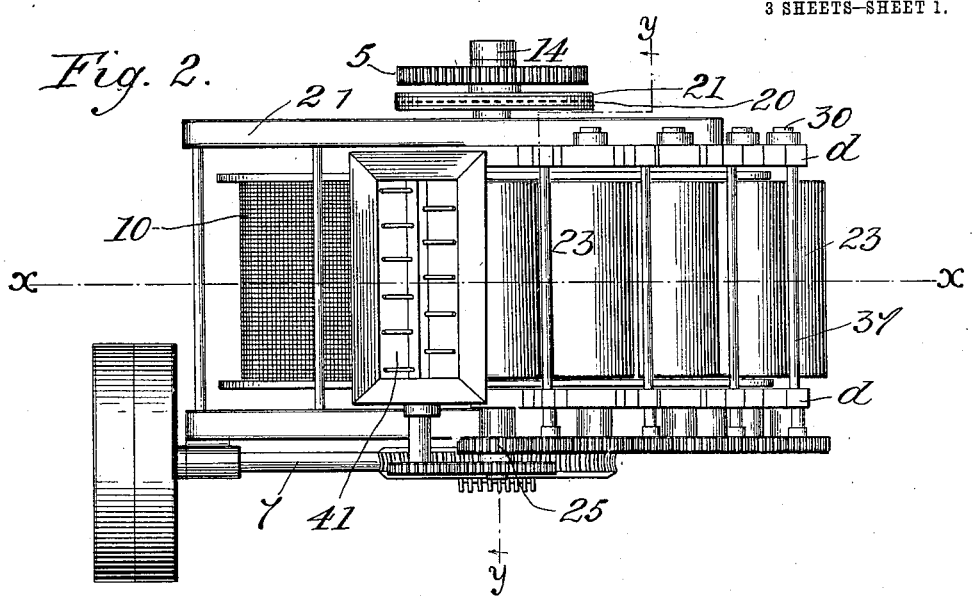
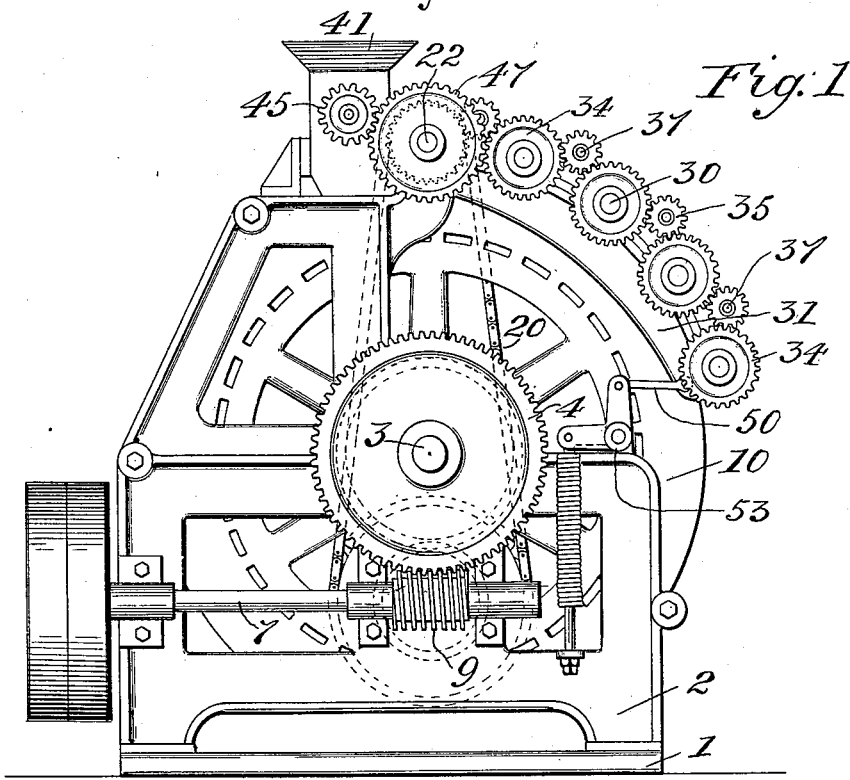
Witnesses
G. F. Baker
Sarah Schotta
Inventor
John B. Adt,
by G. H. & W. T. Howard
Attorneys

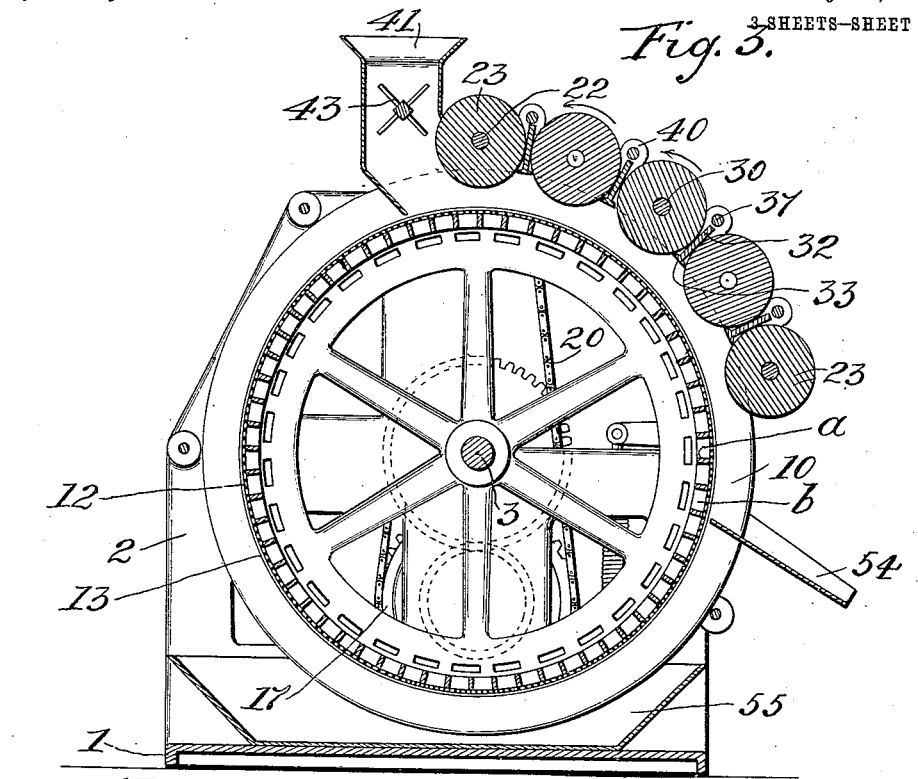
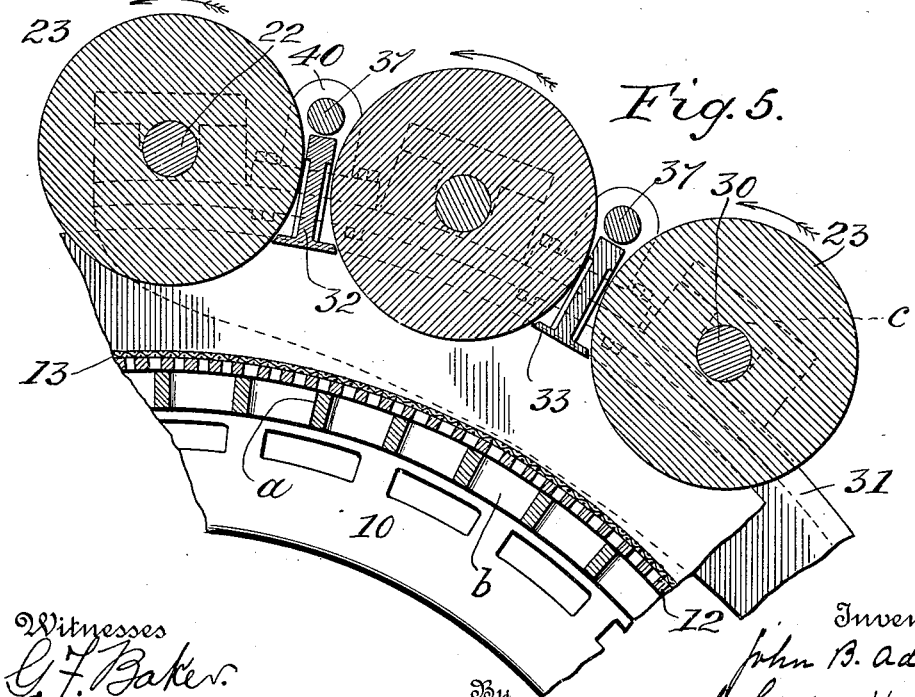

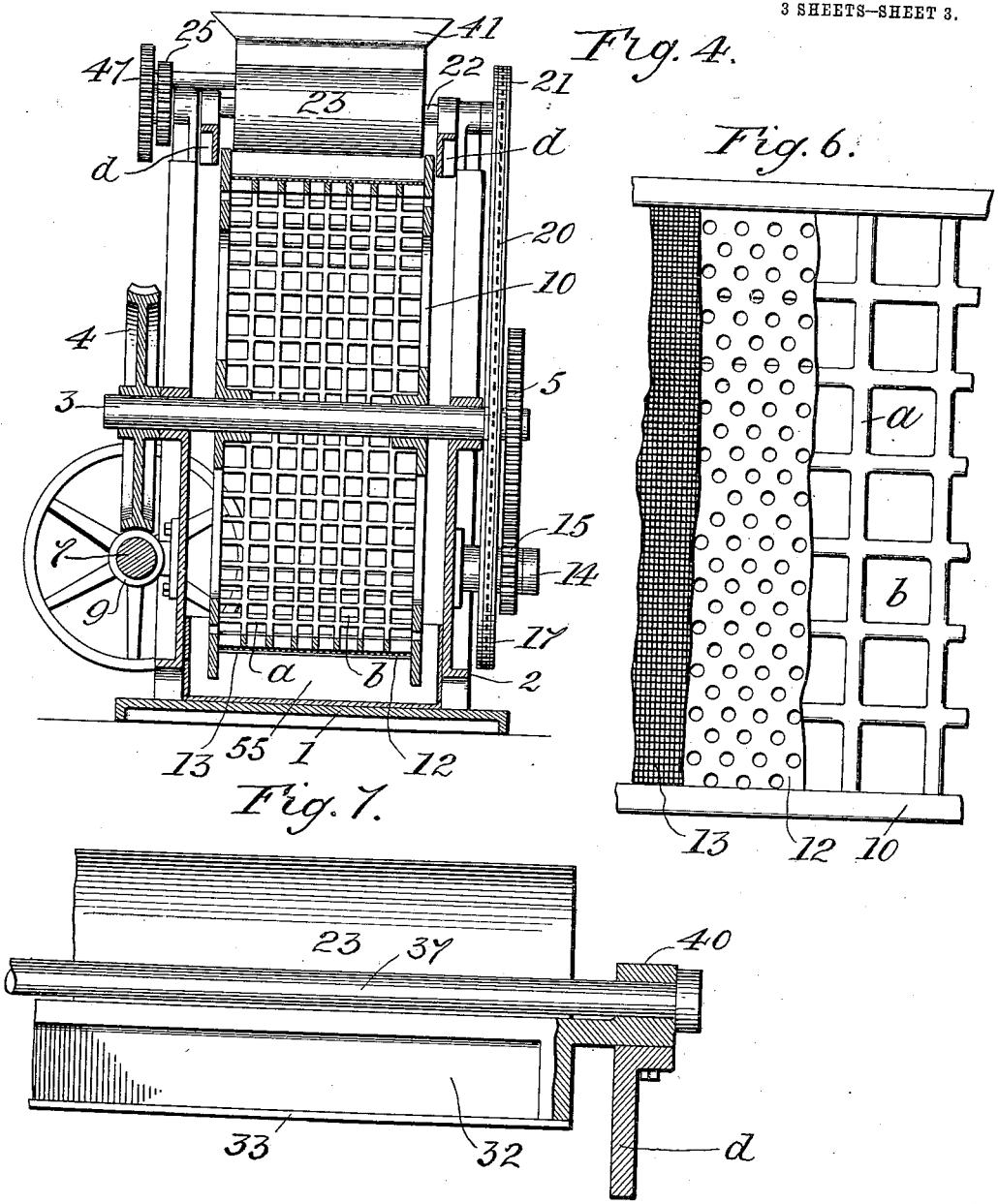

UNITED STATES PATENT OFFICE.

JOHN B. ADT, OF BALTIMORE, MARYLAND, ASSIGNOR TO THE JOHN B. ADT COMPANY, A CORPORATION OF MARYLAND.

FILTERING-PRESS.

1,098,075. Specification of Letters Patent. Patented May 26, 1914.

Application filed September 5, 1913. Serial No. 788,249.

*To all whom it may concern:*

Be it known that I, JOHN B. ADT, of the city of Baltimore and State of Maryland, have invented certain Improvements in Filtering-Presses, of which the following is a specification.

This invention relates to improved means for expressing from materials such for instance, as grain which has been used in brewing and distilling operations, a large proportion of the contained water, thereby facilitating a drying operation to which the material is subsequently subjected; and the apparatus as hereinafter described and claimed, is particularly applicable for use in connection with a drying apparatus for which Letters Patent No. 1,057,912 were granted to me on the 1st day of April in the year 1913 to which reference should be made.

In the description of the present invention which follows, reference is made to the accompanying drawings forming a part hereof and in which:—

Figure 1 is an exterior front view of the improved apparatus, and Fig. 2 a plan of the same. Fig. 3 is a section taken on the broken line $x$—$x$ in Fig. 2; and Fig. 4 a section taken on the broken line $y$—$y$ in the same figure. Fig. 5 is an enlarged sectional view of certain parts of the apparatus shown particularly in Fig. 3. Figs. 6 and 7 are enlarged views of other parts of the apparatus, and hereinafter described.

Referring now to the drawings, 1 and 2 are respectively, the base plate, and the frame of the machine.

3 is a shaft extending horizontally through and supported by the frame 2, having at one end the worm wheel 4, and at the other end, the spur gear wheel 5.

7 is the driving shaft provided with the worm 9 which communicates rotation to the worm wheel 4; and 10 is a flanged skeleton drum fastened to the shaft 3, the body $a$ of which is reticulated or provided with a multiplicity of openings $b$ as best shown in Figs. 4 and 6. The body $a$ of the drum serves as the main support for the cylindrical perforated plate 12 which in turn supports and is enveloped by the gauze covering 13 of fine mesh, and the said three parts of the drum which are secured together in any suitable manner, thereby produce a composite rotary element of the apparatus. It will be understood that the gauze alone is the effective straining or filtering material through which water expressed from the material passes into and from the drum 10, the perforated plate 12, merely serving as an effective support for the gauze which is subjected to considerable exterior pressure applied thereto through the medium of rollers as hereinafter described.

14 is a stud projecting horizontally from one side of the frame 2 (see particularly Fig. 4) having thereon a loose pinion 15 which is in mesh with the spur gear wheel 5; and 17 is a sprocket wheel fastened to the said loose pinion which transmits rotation, by means of the sprocket chain 20, to the sprocket wheel 21 which is tight on the shaft 22 situated directly over the shaft 3. Fastened to the shaft 22 is the first roll 23 of several similar rolls the ends of which are partially covered by the flanges of the drum with which they are practically in contact, as best shown in Figs. 3 and 4; and at one end of the said shaft is secured the spur gear wheel 25 which imparts rotation by means of other gearing hereinafter described, to the remaining rolls of the system.

The shafts 30 of the rolls 23 rotate in suitable bearing boxes $c$ formed on the curved arm 31 which is constructed mainly of two branches $d$, and is adapted to swing on the shaft 22. The branches $d$ of the arm 31, are braced together by the transverse bars 32 the lower edges of which are provided with scrapers 33 (shown in Figs. 3 and 5) in practical contact with the rolls between which they are situated.

As before stated, the first or upper roll of the system of rolls is driven directly by the shaft 22. The remaining rolls or those beneath, are rotated by means of the spur gear wheels 34, and the intermediate idle pinions 35 whose shafts 37 are journaled in lugs 40 fastened by screws to the branches $d$ of the arm 31, as best shown in Fig. 5.

It will be understood that the function of the intermediate idle spur pinions is to cause all the rolls to rotate in the same direction, that is to say in the direction indicated by the curved arrows in Figs. 3 and 5.

41 is a hopper to receive the materials from which water is to be expressed. It is supported by the frame 2, and contains a rotary agitator 43 which is driven by the spur gear wheels 45 and 47, the latter being secured to the shaft 22; and in order that the material as it passes from the hopper to the space between the rotary drum and the rolls 23 may be adequately pressed, the lower end of the curved arm 31 is connected by a link 50 to a spring-held bell-crank 53, shown only in Fig. 1.

It will be understood that with the construction described, the lowest roll of the system of rolls, is held yieldingly nearer to the drum than are the rolls above it, and in consequence, the water expressing operation is a gradual one and the effectiveness of the apparatus thereby increased.

54 is a delivery chute shown only in Fig. 3, to carry off the compressed material to any suitable receptacle; and 55 a pan situated beneath the drum 10 to receive the water which has been forced from the material through the gauze 13, to the interior of the rotary drum, by the action of the rolls 23.

Supposing the apparatus to be in operation, wet material fed into the hopper 41, is agitated to break up the lumped portions thereof. From the hopper the material falls by gravity to the surface of the rotating drum 10 and is carried by it to under the system of rolls 23 whereby it is pressed against the gauze covering 13 of the rotating drum, the water passing through the gauze to the interior of the drum, from which it escapes to the pan 55.

I claim as my invention:—

1. In an apparatus to express water from a material of substantially the character described, a rotary drum having a cylindrical filtering surface for the passage of water therethrough, combined with a pivotally suspended system of rolls in proximity to the said surface, appliances to produce rotation of the rolls, independently of the surface of the drum, and means to convey the material to between the filtering drum and the said rolls.

2. In an apparatus to express water from a material of substantially the character described, a rotary drum having a cylindrical filtering surface for the passage of water therethrough, combined with driven rolls with their circumferences exposed to the said filtering surface and in close proximity to the same, appliances to effect a collective movement of the rolls toward the drum, and means to convey the said material to between the drum and the rolls.

3. In an apparatus to express water from a material of substantially the character described, a rotary drum having a cylindrical filtering surface for the passage of water therethrough, combined with a pivoted arm carrying a system of driven rolls in proximity to the said filtering surface of the drum, spring mechanism to draw the said rolls toward the filtering surface, and a feed hopper in communication with the space existing between the cylindrical surface of the drum and the rolls.

4. In an apparatus to express water from a material of substantially the character described, a rotary drum having a cylindrical filtering surface for the passage of water therethrough, combined with a pivoted arm carrying a system of driven rolls in proximity to the said filtering surface, spring mechanism to draw the said rolls toward the filtering surface, scrapers situated between the rolls, and a feed hopper in communication with the space existing between the cylindrical surface of the drum and the rolls.

5. In an apparatus to express water from a material of substantially the character described, a rotary drum having a cylindrical filtering surface adapted for the passage of water therethrough, combined with a pivoted arm carrying a system of driven rolls in proximity to the said filtering surface, spring mechanism to draw the said rolls toward the filtering surface, scrapers situated between the rolls having a movement in common with the pivoted arm, and a feed hopper in communication with the space existing between the cylindrical surface of the drum and the rolls.

JOHN B. ADT.

Witnesses:
WM. T. HOWARD,
SARAH SCHOTTA.